United States Patent [19]

Rangel-Garza et al.

[11] 3,729,142
[45] Apr. 24, 1973

[54] DRIPPERS FOR IRRIGATION

[76] Inventors: Javier Rangel-Garza; Jaime Leal-Diaz, both of Escobedo 733 Sur Suite 316, Monterrey, Nuevo Leon, Mexico

[22] Filed: Dec. 3, 1970

[21] Appl. No.: 94,693

[52] U.S. Cl. .................... 239/542, 138/42, 239/547
[51] Int. Cl. ................................................. B05b 1/30
[58] Field of Search .................... 239/86, 488, 547, 239/456, 542, 285, 581, 582; 138/42

[56] References Cited

UNITED STATES PATENTS

| | | | |
|---|---|---|---|
| 2,597,775 | 5/1952 | Brown | 138/42 X |
| 2,992,659 | 7/1961 | Thomas | 138/42 |
| 3,604,728 | 9/1971 | Symcha et al. | 239/542 UX |
| 1,659,470 | 2/1928 | Owen et al. | 239/547 |
| 2,752,201 | 6/1956 | Blass | 239/488 X |
| 2,760,824 | 8/1956 | Leadbetter | 239/547 X |
| 2,968,440 | 1/1961 | Cone | 239/456 X |
| 3,084,869 | 4/1963 | Hutty et al. | 239/547 X |
| 3,586,239 | 6/1971 | Blass | 239/542 X |

FOREIGN PATENTS OR APPLICATIONS

| | | | |
|---|---|---|---|
| 928,690 | 6/1963 | Great Britain | 239/547 |

Primary Examiner—M. Henson Wood, Jr.
Assistant Examiner—Michael Mar
Attorney—Laurence R. Brown

[57] ABSTRACT

A dripper for irrigation has a removable male member with a handle and ridges providing a meandering water flow path for controlling pressure drop and is held in a smooth walled female receptacle by tabs for quick removal by twisting the handle. A clamping member accompanying holds the dripper by surrounding supply pipe lines of various sizes with an aperture therethrough to receive a dripper extension by means of a mating lock hook portion engaging the inner walls of the supply pipe line. The dripper male member ridges may be made of plastic to allow ready removal of ridge portions for changing the path and drip rate.

13 Claims, 10 Drawing Figures

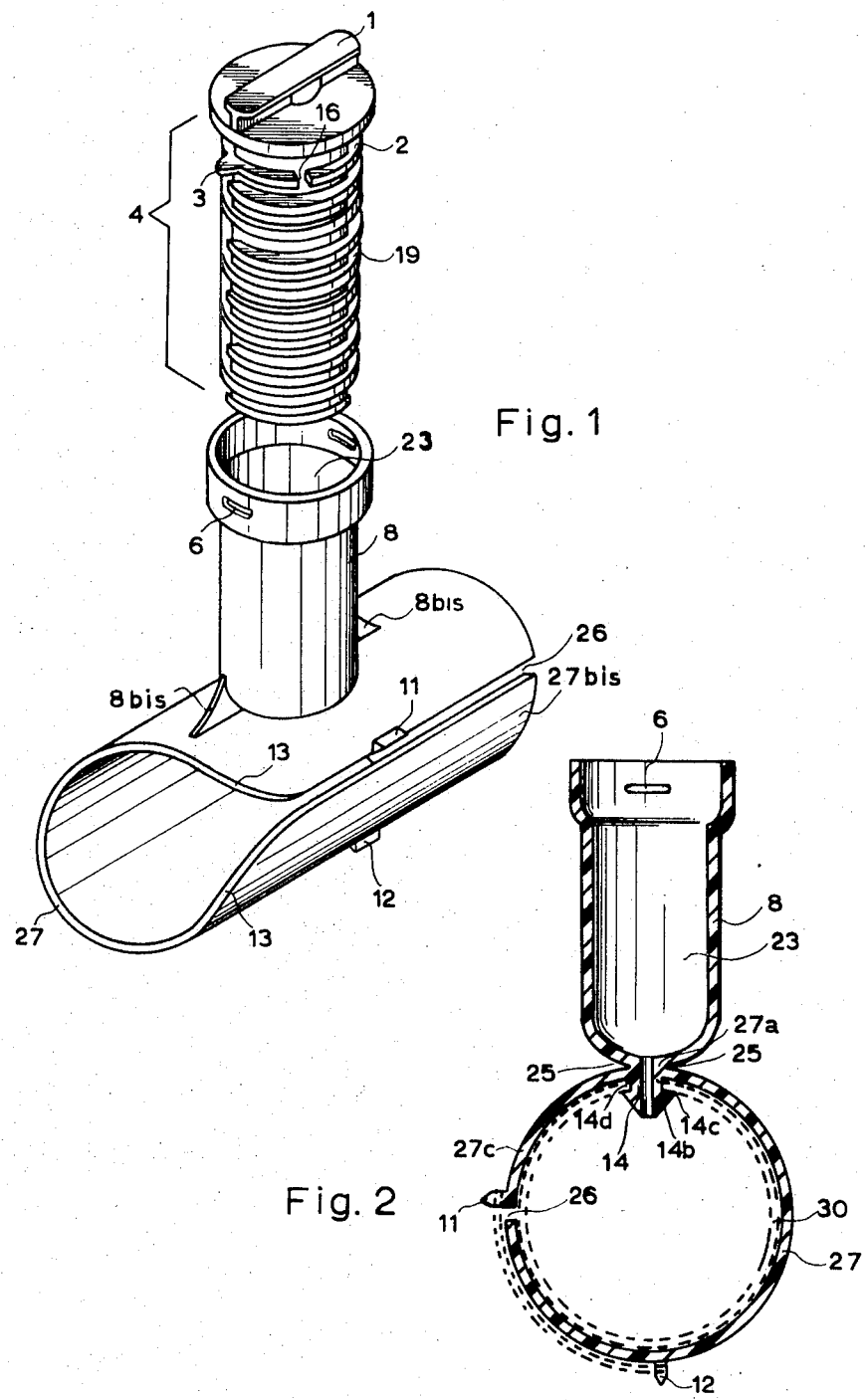

DRIPPERS FOR IRRIGATION

This invention relates to a system of irrigation by dripping, and more specifically to a dripper combined with a clamp that has the characteristic of being able to be coupled to any hose or pipe line of any caliber or diameter with the advantage that it will not be necessary to hole such dripper with any additional holders, due to the fact that the dripper object of this application is provided at the moment it is manufactured with a clamp of the universal type that very easily will permit, as a consequence of its shape, the insertion and coupling of the dripper-clamp to any type of hose or pipe line.

This invention also relates to a new system or irrigation by dripping, and more specifically to a dripper on which two sections are utilized. A male section and a female section that may be assembled or disassembled in order to permit its inside cleaning. The male section having the characteristic of a long body with discs that have cavities through which water is permitted to pass from one point of entrance to a point of exit, and a filter ring that diminishes the possibility of clogging. This invention has also an interceptor along its body to the sides of which are alternated cavities to allow the passage of the water from one chamber of decompression to another. As a consequence of the interceptor, a change in the direction of the circulation is produced in every one of the chambers of decompression that reduces the pressure of the water or solution. This system has the advantage of permitting a better control between the source of entrance and the exit in such a way that a very effective and regular dripping is produced and regulated for irrigation purposes.

As a consequence of the invention described above, better efficiency is possible in a shorter space and a better decompression in less space, which will result as it was said before, in a better control of the irrigation by dripping and in saving of raw material when such drippers are manufactured.

Today there are systems through which it is possible to irrigate any kind of soil. However, the system of drippers used actually lack the advantages that this invention claims, because it is possible through the use of this invention, in the first place, to effect an easier and more practical coupling of the dripper to the lines of water, and as consequence of this better coupling, to effect a tighter permanence of the dripper to the water lines. Consequently, better irrigation results by the use of these drippers. In second place, in this dripper it is easier to couple or uncouple the male section to or from the female section, which will allow cleaning the inside of such dripper in the case of clogging. It will also permit modifying the flow of the water or solution circulating along the dripper according to the necessities of irrigation.

The details and characteristics of the dripper-clamp are shown clearly in the following description and on the drawings that are included as an illustration of such, and having the same signs of reference, to indicate the same parts in the shown figures.

FIG. 1 is a conventional view of the dripper-clamp in which the male section is outside of the female section.

FIG. 2 is a vertical cross-sectional view of the dripper-clamp, in which are shown the male section, the pivot and the clamp with its nails, as well as a pointed section showing the pipe line or hose.

Figure 6:
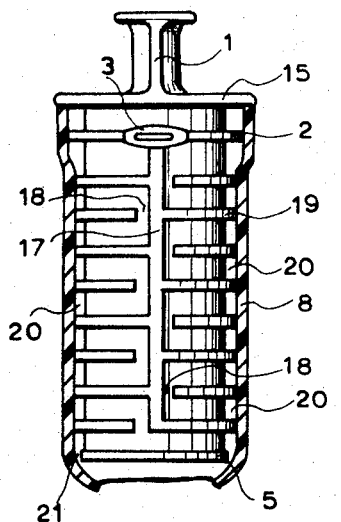

FIG. 6 is a fragmentary cross sectional view of the male section and female section. In this figure it is possible to see the cavities, the position of the male section once it has been coupled to the female section, and the position of the walls of the female section in connection with the discs and the filter ring. Also, this figure shows the chambers of decompression, formed when the male section and the female section are duly coupled.

Figure 7:
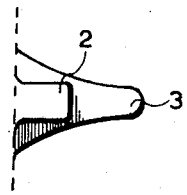

FIG. 7 is a sectional view of the ear and the butt.

Figure 8:
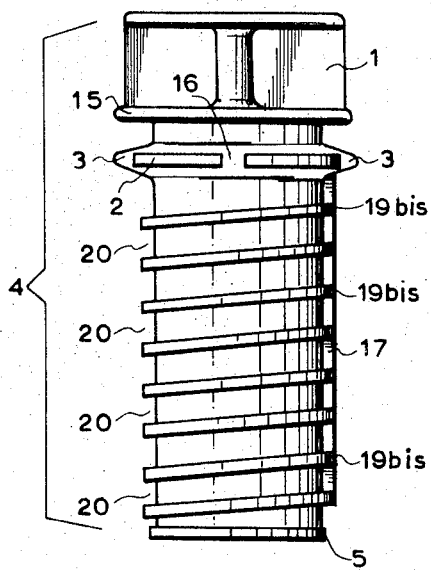

FIG. 8 shows a view of the male section in which the discs are forming a spiral.

Figure 9:
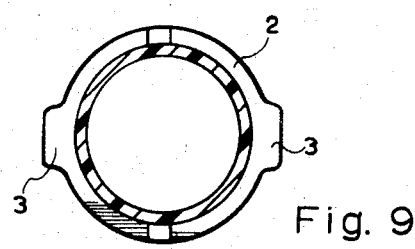

FIG. 9 is a top sectional view of the male section at the point where the ear and the butt are placed.

Figure 10:
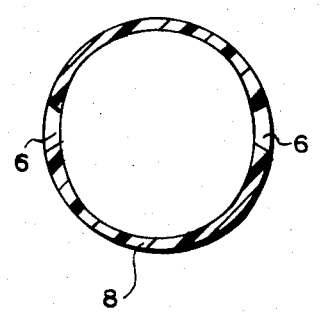

FIG. 10 is a top sectional view of the female section at the point where the holes are placed.

Referring now to the drawings, such dripper-clamp is formed first by a male section 4 and a female section 8. This last has, as forming part of itself and precisely in its lowest part, the clamp 27 that even forming one body with the female section has functions specifically independent from the functions of the female section.

The male section 4 has on its highest point a handle 1 which function is to handle the body of the male section 4, to pull it out or push it in, from or to the hollow 23 of the female section. The male section 4 has a body formed on its highest point by the top ring 15 whose function is to stop the movement of the male section 4, so this male section 4 cannot penetrate deeper than the point where it should be inside the hollow 23 of the female section, as well as to stop the entrance of dust or particles to the inside of the dripper. The butt 2 is located after the top ring. This butt 2 will assure that no particle or dust gets inside the dripper. The butt 2 brings in contact this part of the male section with the body of the female section 8 at the same time the butt 2 has in its ends two ears 3, which function to penetrate in the holes 6 located on the sides of the body of the female section 8.

Along its body 4 the male section has the discs 19 or continuous spiral 19 Bis, these discs or spirals having spaces between them called chambers of decompression 20, having the function to reduce the pressure of the water going through to the exit. The water will penetrate to the inside of the chambers of decompression 20 through the entrance 21 formed by the walls of the body of the female section 8 and the filter rings 5 of the male section 4, continuing its penetration through the chambers of decompression 20 along the cavities 18. These cavities 18 are located one in each disc 19 in an alternated position. Such alternation is possible due to the interceptor 17 that is a rib dividing the area of the chambers of decompression 20. It is understood that every dripper may have one or more interceptors. The interceptor 17 avoids that every chamber of decompression 20 be communicated with itself all through its extention by intercepting its inside area. The cavities 18 are located in the following way. The lower cavity 18 of the lower disc 19 will be placed to the left side of the interceptor 17. Through it the water will penetrate and look for an exit. The only exit it will find will be after going around the chamber of decompression 20 until it finds the following cavity 18 of the following disc 19 located to the right of the interceptor 17. Such cavity will be an exit for the water going along the chamber of decompression 20 due to the fact that the interceptor 17 will avoid that the water continues its way through the chamber of decompression 20 already passed. As a consequence, the water will have to go up to the following chamber of decompression 20, it will penetrate looking for another exit. As that happens, the direction of the water will be inverted due to the interceptor 17 that will stop it from going the same direction it was going in the lower chamber of decompression 20. As a result, the water will have to go up to the following chamber of decompression 20, and also will try to find an exit, in this case following again the opposite direction. Since the interceptor 17 will cause the water to follow a different direction than it was following in the lower chamber of decompression 20, a more efficient loss of pressure of such water will be accomplished, which will also produce an effective regulation at the moment it gets out through the exit 16 according to the necessities of irrigation. It is obvious that the discs forming the chambers of decompression 20 may be combined on changed in shape, size, position, number or location, according to the necessities of irrigation.

Due to the location of the discs 19 and to the existence of the interceptor 17, it is possible through a very simple operation to produce a larger flow of the water to the exit 16. For such purpose, it will only be necessary to pull out the male section 4 and cut a little section of the discs 19 in such a way that two cavities be produced on one side of the interceptor following one to another. This will produce a direct flow of the water directly from one chamber of decompression 20 to another, jumping one of the cycles.

If it is necessary to increase the flow more rapidly to the exit, the only thing to be done is to repeat the operation described before to make the cavities 18 to coincide, reducing this way the cycles along the chambers of decompression 20.

As it was said before, the male section 4 may be pulled out from the inside 23 of the female section 8. Such operation is necessary in those cases in which for any reason a clogging is produced in any of the chambers of decompression 20 or when a clogging is produced accidentally in the pivot 14, in its exit 16, or in any other place of the dripper. For the purpose of securing the male section 4 in the hollow 23 of the female section 8, it will only be necessary to introduce the male section 4 forcing it by means of the handle 1 up to the point that the ears 3 coincide with the holes 6 where the ears 3 will be secured. This will permit that the male section 4 in no case jumps out accidentally from the hollow of the female section 8. The male section 4 has in its lower part a filter ring 5 of a lesser diameter than the discs 19, which will allow a space 21 between the lower inside wall of the female section 8 and the filter ring 5 of the male section 4. This filter ring 5 will function as filter, since the space 21 is narrower than the chambers of decompression 20 and the cavities 18. This avoids that any particle could go inside the chambers of decompression 20 interrupting the flow of the water, since these particles will be intercepted or stopped by the filter ring 5.

To communicate the female section 8 with the pipe line or hose 30 there is a pivot 14. Such pivot 14 has at the end 14 B a lock hook 14 C. This lock hook 14 C is formed by a cone of a larger diameter in its base than the stem that forms the neck of the pivot 14, and will keep the pivot 14 steadily secured to the pipe line 30. The space of separation 14 D in the pivot 14 should be enough to let the lock hook to penetrate the width of the wall of the pipe line or hose 30 to which the dripper-clamp is going to be coupled.

It is important to notice that as a consequence of the position of the pivot 14, in relation to the body of the female section 8 and to the clamp 27, the pivot 14 holds with the help of the lock hook 14 C the female section 8 so it does not change its position, remaining placed and coupled to the pipe line or hose 30, since the clamp 27 and the female section 8 will not loosen accidentally.

Figure 3:
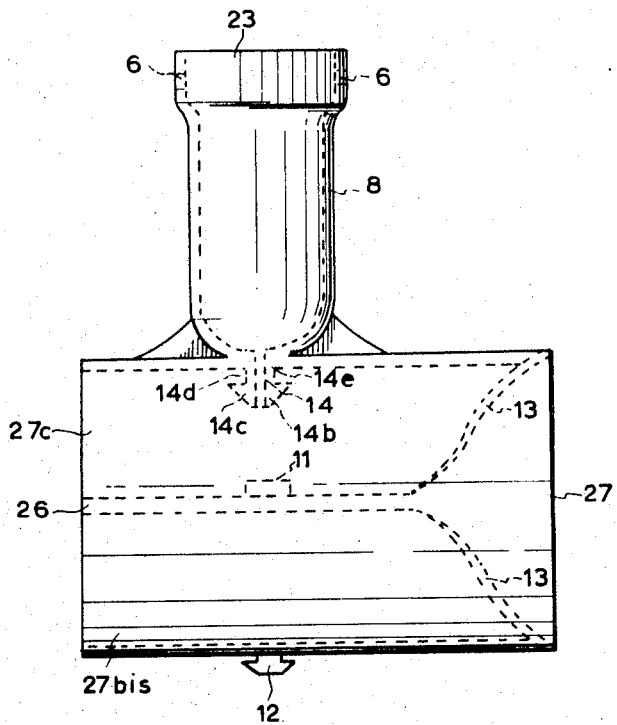
FIG. 3 is a rear view of the female section-clamp, showing the female section, the pivot and the clamp with its nails.
Figure 4:
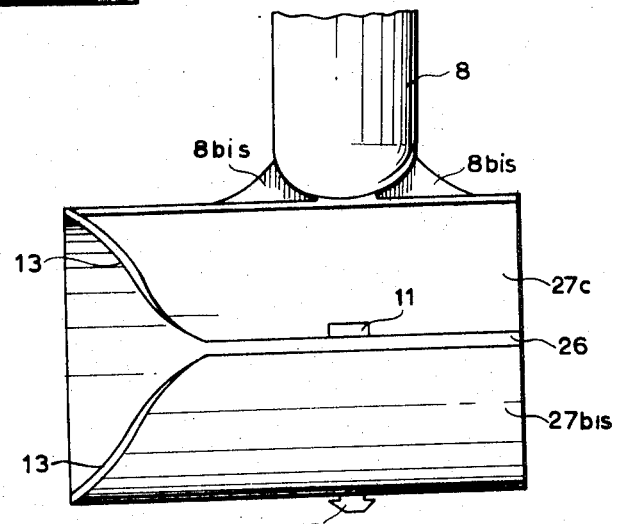
FIG. 4 shows a frontal view of the dripper-clamp.
Figure 5:
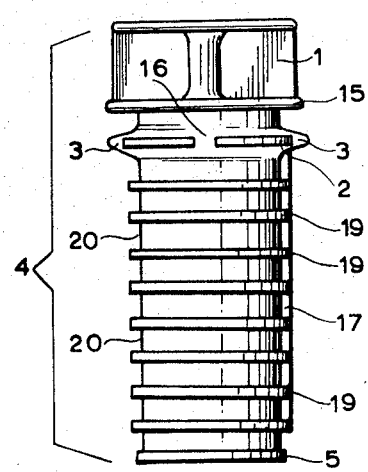
FIG. 5 is a view of the male section on which the handle, the top ring, the discs and the filter ring are shown. This figure also shows the exit holes of the first disc and the ears.

The clamp 27 is manufactured of the same material as the body of the female section 8 and is united to it in the joint point 27 A. However, it is necessary to make clear that this invention has the characteristic that, although the joint point 27 A keeps the female section 8 united to the clamp 27, there is between them the angle of flexion 25 through which it is possible to flex the clamp 27 for two purposes. First, to let the hose or pipe line 30 penetrate to the inside of the clamp 27, and second, to let the clamp 27 be coupled to the external wall of the hose or pipe line 30 to which such dripper-clamp is going to be coupled, even if this hose or pipe line 30 is of a different diameter than the diameter of the clamp 27. The clamp 27 has an optional section 27 Bis called optional section 27 Bis, since this may remain forming part of the clamp 27 but may be shortened by cutting it in the case it be necessary to reduce the diameter of the clamp 27 in order to couple it to a hose or pipe line of smaller diameter. This optional section 27 Bis is part of the clamp 27 as it is shown in FIG. 4, and it only becomes optional for the purpose of reducing the diameter of the clamp 27.

Once the clamp 27 has been placed on the hose or pipe line 30 it may be secured by means of a tightening belt 12 Bis , shown in FIG. 2 with dotted lines, affixed on one side to the lower nail, and on the other side to the upper nail 11. The tightening belt 12 Bis may be manufactured of any plastic material or rubber, and even of metal. It is obvious that the function of the tightening belt is to keep the clamp 27 steadily affixed to the hose or pipe line 30. This tightening belt 12 Bis may form also one part with the clamp 27. In such case it will need only one nail.

The front part of the clamp 27 is formed of two sections 27 Bis and 27 C having an end shape 13, in order to simplify the coupling of the clamp 27 to the body of the hose or pipe line 30 since such shape 13 permits the easy opening and adaptation of the clamp 27 by forcing the sections 27 Bis and 27C of the clamp 27 to expand up to the moment that the hose or pipe line 30 has penetrated into the clamp 27. Once the hose or pipe line has penetrated into the clamp 27, the sections 27 Bis and 27C will go back to their original position embracing the hose or pipe line 30, keeping coupled the female section 8 to the hose or pipe line and consequently the rest of the dripper-clamp. The clamp 27 has also an opening 26 along its body. Through this opening 26 it is possible to insert the hose or pipe line 30. This opening is placed with an angle of 90° in respect to the pivot 14. This way more resistance is obtained from the clamp 27 in connection to the location of the body of the female section 8 and the hose or pipe line 30. It should be clear that the angle of 90° mentioned before is the ideal, however, it may be changed for certain types of hoses, pipe lines 30 or special works.

In the higher point of the clamp 27, and working as base of the female section 8, there are two ribs 8 Bis, whose function will be to provide a secure joining of the body of the female section 8 to the clamp 27. This will assure the permanence of connection of the body of the female section 8 to the clamp 27. These ribs of Bis are precisely located along the highest external part of the clamp 27 so they will not interfere with the flexion of sections 27 Bis and 27C.

This dripper-clamp may be manufactured of plastic, however, it may also be manufactured of any other suitable material.

It is also shown that this dripper-clamp may be coupled to a pipe line or hose and will be used to irrigate any kind of soil.

It is to be understood that the forms of our invention herewith shown and described are to be taken as preferred examples of the same, and that various changes in the shape, size and arrangement of parts may be resorted to without departing from the spirit of the invention or the scope of the subjoining claims.

It is also understood that this system and the parts described above may be used for any other industrial purpose.

We claim:

1. An irrigation dripper assembly comprising in combination, a substantially cylindrical hollow thin walled female member having an open receptacle end and a smooth interior wall surface, a male member for insertion into said female member having ridges on its outer surface for engaging said interior wall and providing between said wall and the valleys between the ridges of the male member a meandering zig-zag liquid flow path and discharge means for the liquids between the male and female members thereby providing with said female and male members a liquid dispensing head, locking means removably holding said male member in position in said female member, clamping means affixed to said female member for mounting said assembly at an aperture located in a continuous liquid feeder pipe, and liquid feed structure arranged to extend into a feeder pipe in mounted position and pass water from the pipe into said meandering flow path.

2. An assembly as defined in claim 1 wherein said locking means comprises a pair of flexible ears extending from said male member and a set of mating receptacle slots in the walls of said female member so arranged that the ears are disengaged from said slots when said male member is rotated within the female member.

3. An assembly as defined in claim 2 wherein the male member includes a handle extending outside said female member for providing a twisting moment to said male member for disengaging said locking means.

4. An assembly as defined in claim 1 wherein said ridges on said male member are of a plastic material that can be readily cut to change said meandering flow path.

5. An assembly as defined in claim 1 wherein the clamping means are integrally attached to said female member.

6. An assembly as defined in claim 1 including a stop member on said male member adapted to contact the female member and close the open receptacle end of said female member to prevent entrance of dirt from outside the head when the locking means is engaged.

7. An assembly as defined in claim 1 wherein the liquid feed structure comprises a pivot member having a neck for registering in the aperture of the feed pipe and an enlarged head for passing through said feeder pipe and engaging the inner surface thereof which pivot member is integrally affixed to said female member and said clamp member at a point of reduced diameter permitting a degree of flexing.

8. An assembly as defined in claim 1 wherein the clamp is a substantially cylindrical shaped member for surrounding the feeder pipe, and the female member is connected thereto to extend substantially normally away from the feeder pipe.

9. An assembly as defined in claim 8 wherein the clamp member has two edges meeting in a direction substantially linearly along the feeder pipe.

10. An assembly as defined in claim 9 including structure for fastening together the two edges of the clamp.

11. An assembly as defined in claim 10 wherein the fastening structure comprises a projecting member on each clamp edge adapted to receive a belt therebetween.

12. An assembly as defined in claim 9 wherein the two edges of said clamp are disposed substantially 90° from the female member about the circumference of the feeder pipe.

13. An assembly as defined in claim 8 wherein the clamp member is of a material that can be readily cut to adapt the assembly to feeder pipes of smaller diameter.

* * * * *